US008313077B2

(12) United States Patent
Rose

(10) Patent No.: US 8,313,077 B2
(45) Date of Patent: Nov. 20, 2012

(54) SHAKER DECK ADJUSTMENT APPARATUS

(75) Inventor: Anthony Rose, Cincinatti, OH (US)

(73) Assignee: M-I L.L.C., Houston, TX (US)

( * ) Notice: Subject to any disclaimer, the term of this patent is extended or adjusted under 35 U.S.C. 154(b) by 79 days.

(21) Appl. No.: 12/921,102

(22) PCT Filed: Mar. 6, 2009

(86) PCT No.: PCT/US2009/036389

§ 371 (c)(1), (2), (4) Date: Sep. 3, 2010

(87) PCT Pub. No.: WO2009/111735

PCT Pub. Date: Sep. 11, 2009

(65) Prior Publication Data

US 2011/0006185 A1 Jan. 13, 2011

Related U.S. Application Data

(60) Provisional application No. 61/034,543, filed on Mar. 7, 2008.

(51) Int. Cl.
*F16M 1/00* (2006.01)

(52) U.S. Cl. ........... 248/638; 248/644; 60/415; 210/171

(58) Field of Classification Search .................. 248/638, 248/644, 560, 646, 648, 654, 655; 60/415; 210/171

See application file for complete search history.

(56) References Cited

U.S. PATENT DOCUMENTS

| | | | | | |
|---|---|---|---|---|---|
| 4,082,657 | A | | 4/1978 | Gage | |
| 4,749,219 | A | * | 6/1988 | Bolle et al. | 294/185 |
| 4,862,697 | A | * | 9/1989 | Tugal et al. | 62/55.5 |
| 5,577,874 | A | * | 11/1996 | Olsen | 414/138.3 |
| 5,934,414 | A | * | 8/1999 | Staczek | 187/269 |
| 5,975,129 | A | | 11/1999 | Williams | |
| 6,079,925 | A | * | 6/2000 | Morgan et al. | 414/22.57 |
| 6,612,633 | B1 | * | 9/2003 | Tell | 294/186 |
| 7,165,498 | B2 | * | 1/2007 | Mackrill et al. | 108/20 |
| 7,278,540 | B2 | | 10/2007 | Stone et al. | |
| 7,331,469 | B2 | | 2/2008 | Padalino et al. | |
| 7,370,568 | B2 | * | 5/2008 | Richardson et al. | 91/4 A |
| 2006/0254964 | A1 | | 11/2006 | Richardson et al. | |

OTHER PUBLICATIONS

International Search Report issued in PCT/US2009/036389, mailed on Oct. 15, 2009, 5 pages.

(Continued)

*Primary Examiner* — Terrell McKinnon
*Assistant Examiner* — Monica Millner
(74) *Attorney, Agent, or Firm* — Osha Liang LLP

(57) ABSTRACT

An apparatus to lift an oilfield machine includes at least one lifting bellows, an alignment assembly extending between at least one lifting bellows and an adapter plate of the oilfield machine, the alignment assembly comprising an inner cylinder to reciprocate within a sleeve of the oilfield machine, and the alignment assembly comprising a top plate at an upper end of the inner cylinder, the top plate configured to transfer forces from the at least one lifting bellows and the inner cylinder to the adapter plate, wherein the sleeve is configured to restrict the inner cylinder to a substantially linear displacements therethrough.

17 Claims, 6 Drawing Sheets

OTHER PUBLICATIONS

Written Opinion issued in PCT/US2009/036389, mailed on Oct. 15, 2009, 3 pages.

Notification Concerning Transmittal of International Preliminary Report on Patentablility and Written Opinion issued in related International Patent Application No. PCT/US2009/036389; Dated Sep. 16, 2010 (5 pages).

Examiner's Report issued in corresponding Canadian Application No. 2,717,774; Dated Jun. 4, 2012 (2 pages).

Office Action issued in corresponding Chinese Application No. 200980108117.9 with English language communication reporting the details of the Office Action; Dated Aug. 13, 2012 (6 pages).

* cited by examiner

SHAKER DECK ADJUSTMENT APPARATUS

BACKGROUND

1. Field

The present disclosure relates to lifting mechanisms for use with oilfield machines. More particularly, the present disclosure relates to lifting apparatus and methods for using the same in conjunction with oilfield shaking separators.

2. Background Art

Rotary drilling methods employing a drill bit and drill stems have long been used to drill wellbores in subterranean formations. Drilling fluids or muds are commonly circulated in the well during such drilling to cool and lubricate the drilling apparatus, lift drilling cuttings out of the wellbore, and counterbalance the subterranean formation pressure encountered. The recirculation of the drilling mud requires the fast and efficient removal of the drilling cuttings and other entrained solids from the drilling mud prior to reuse. Shaker separators are commonly used to remove the bulk solids from the drilling mud.

A shaker separator consists of an elongated, box-like, rigid bed and a screen attached to, and extending across, the bed. The bed is vibrated as the material to be separated is introduced to the screen which moves the relatively large size material along the screen and off the end of the bed. The liquid and/or relatively small sized material is passed into a pan. The bed can be vibrated by pneumatic, hydraulic, or rotary vibrators, in a conventional manner.

Various solids are brought up from the wellbore with the mud, including drill cuttings, clay, and debris. Sometimes clay that is directed into the shaker separator with the drilling fluid is sticky and heavy. Such solids risk causing screen breakage because they stick to the screen and are not transported to the discharge end of the shaker in an efficient manner. In such cases, it is desirable to lower the discharge end of the shaker bed to assist in the removal of the sticky solids from the screen.

At other times, coarse solids are easily conveyed along the top of the screen by the vibratory motion of the shaker. In order to preserve the drilling mud and increase the volume flow rate of the mud being directed into the separator, it is desirable to raise the discharge end of the shaker bed. When the discharge end is raised, the mud flow rate may be maximized while mud loss over the screen is minimized.

Some shaker separators have been built with systems to elevate the discharge end of the shaker bed. Many of these systems have employed manual operation techniques, such as hand wheels or jacks, to raise and lower the end of the bed. Other systems have included hydraulic lifts that are independently actuated, often requiring time and finesse by the operator to laterally level the discharge end of the shaker bed. Further, these systems have also included solenoids, which may be undesirable in the hazardous locations in which shaker separators are often used, particularly when separating drill cuttings from drilling mud. Thus, there is a need for a system to raise the discharge end of the shaker bed quickly and safely while keeping it level from side to side.

SUMMARY

In one aspect, the present disclosure relates to an apparatus to lift an oilfield machine including at least one lifting bellows, an alignment assembly extending between at least one lifting bellows and an adapter plate of the oilfield machine, the alignment assembly comprising an inner cylinder to reciprocate within a sleeve of the oilfield machine, and the alignment assembly comprising a top plate at an upper end of the inner cylinder, the top plate configured to transfer forces from the at least one lifting bellows and the inner cylinder to the adapter plate, wherein the sleeve is configured to restrict the inner cylinder to a substantially linear displacements therethrough.

In another aspect, the present disclosure relates to a method to lift an oilfield machine including positioning at least one lifting bellows beneath a component of the oilfield machine to be raised, positioning an alignment assembly between the at least one lifting bellows and an adapter plate of the component, wherein the alignment assembly comprises an inner cylinder and a top plate, wherein the inner cylinder is configured to reciprocate within a sleeve of the oilfield machine, inflating the lifting bellows beneath to raise the component with the inner cylinder, and restricting the inner cylinder to a substantially linear displacements with the sleeve.

DETAILED DESCRIPTION

Figure 1:
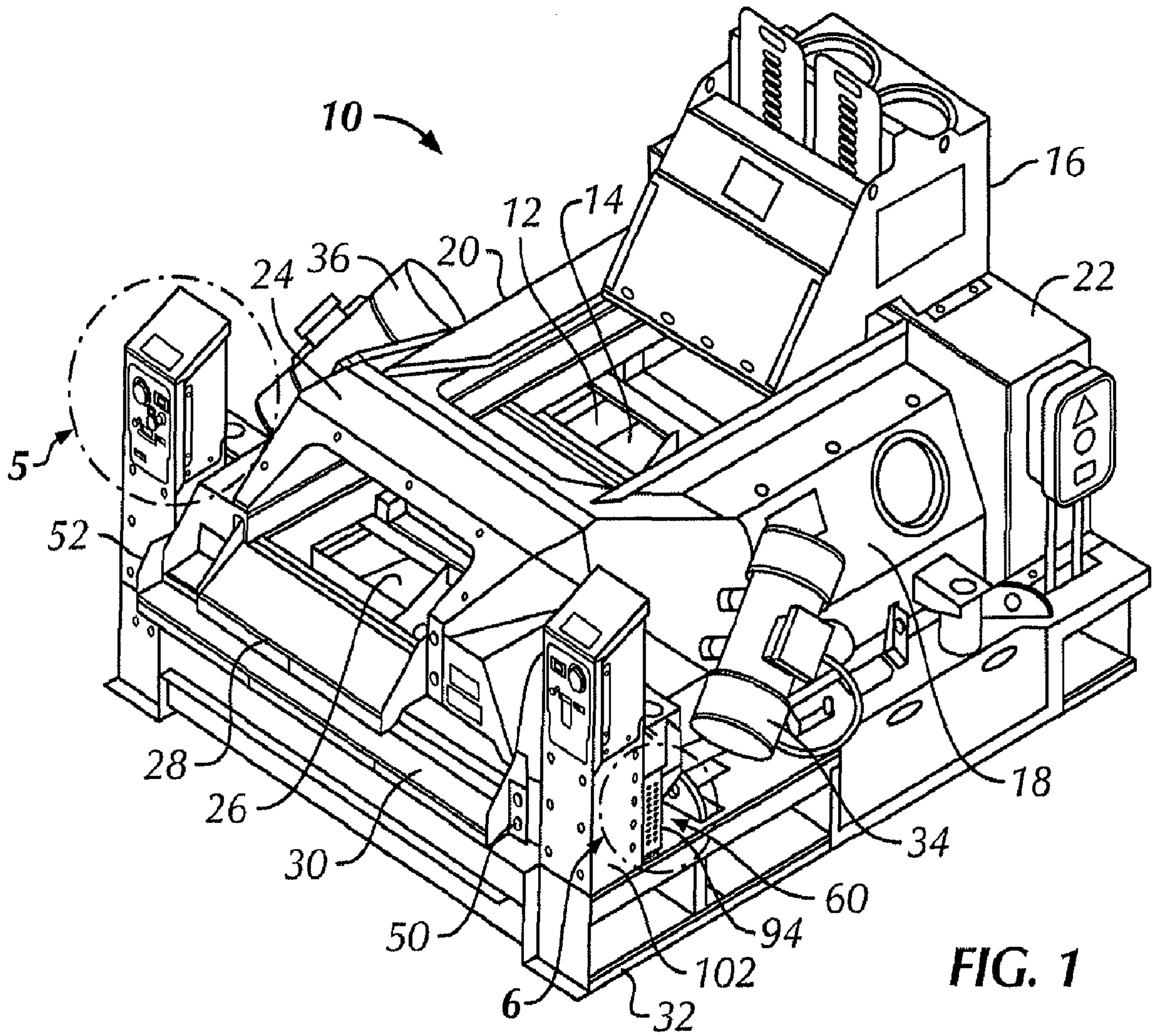
FIG. 1 is a perspective view of a shaker assembly.

Referring initially to FIG. 1, the reference numeral 10 refers, in general, to a vibrating screen separator assembly that includes a frame, or bed 12, that includes a bottom wall 14 having an opening (not shown), a pair of side walls 18 and 20, and a cross support member 24 coupled between the walls 18, 20. Actuator 34 and 36, respectively for imparting motion to the bed 12 are also coupled to the support member 24.

A flow box 16 is located at a feed end 22 of the shaker bed 12 to direct solid-bearing drilling mud to the screens 26, located therein. A slide 28 may be located at the discharge end 30 of the shaker bed 12 to direct separated solids to a collection area (not shown). The shaker 10 may be mounted to a skid 32 to facilitate transport of the shaker 10 to the drill site as well as to aid in the positioning and relocation of the shaker 10 within the drill site.

Figure 2:
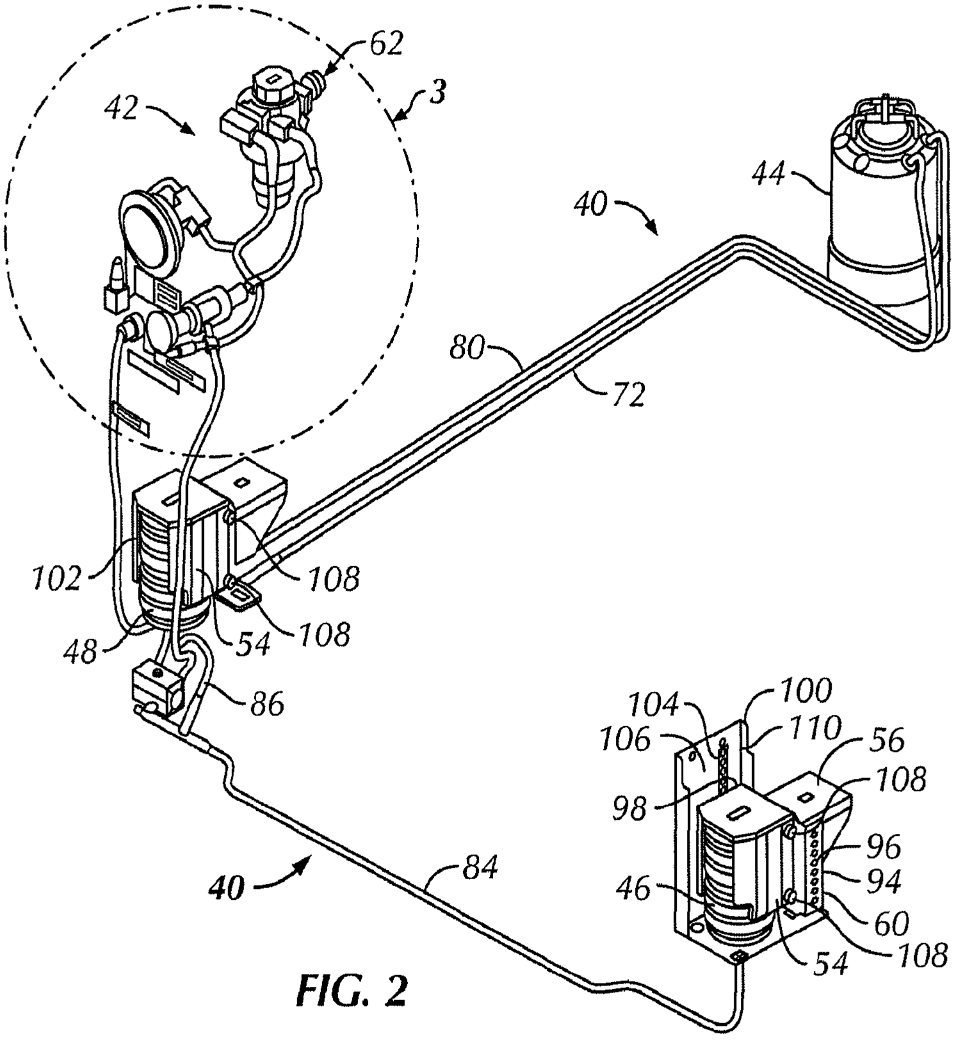
FIG. 2 is a perspective view of an embodiment of a shaker lift system.

Referring to FIG. 2, the lift system 40 includes a lift control assembly 42, a hydraulic tank 44, a first bellow 46, and a second bellow 48. The first and second bellows 46, 48 are located near opposing corners 50, 52 of the discharge end 30 of the shaker bed 12 (shown in FIG. 1). A shroud 54 is mounted to each of the first and second bellows 46, 48 to help protect them from damage. An adapter plate 56 mounted to each shroud 54 attaches to an adjacent side wall 18, 20 near the discharge end 30 of the shaker separator 10.

In one embodiment, shown in FIG. 2, the lift control assembly 42 is located at the discharge end 30 of the shaker bed 12 and the hydraulic tank 44 is shown to be at the feed end 22 of the shaker bed 12. However the location of the lift control assembly 42 and the hydraulic tank 44 may be varied such that the lift control assembly 42 is located anywhere along the perimeter of the shaker assembly 10 where it is reachable by an operator and the hydraulic tank 44 is located in such proximity to first and second bellows 46 and 48 that fluid communication may reasonably be maintained between the hydraulic tank 44 and the bellows 46, 48.

The lift control assembly 42 is operable to control pressurized air to and from the hydraulic tank 44 as well as to control communication of fluid between the hydraulic tank 44 and each of the bellows 46, 48. As will be described, the lifting system 40 utilizes an air over fluid hydraulic system to raise and lower the discharge end 30 of the shaker bed 12, thereby providing a range of incline to the bed 12 of the shaker separator 10.

The hydraulic tank 44 is provided with a predetermined amount of liquid. In one embodiment, the liquid is water, such as when the shaker separator 10 is to be operated in temperatures where the water will not freeze. In one embodiment, the liquid is a fluid having an hydraulic fluid having a freezing point low enough for use in cold climates. A pneumatic line 72 directs air into the hydraulic tank 44 from the lift control assembly 42. A first hydraulic line 80 directs the liquid to the bellows 46, 48. The flow through the first hydraulic line 80 is controlled by the lift control assembly 42. Thus, there is not a continuously open flow line between the hydraulic tank 44 and the bellows 46, 48.

Figure 3:
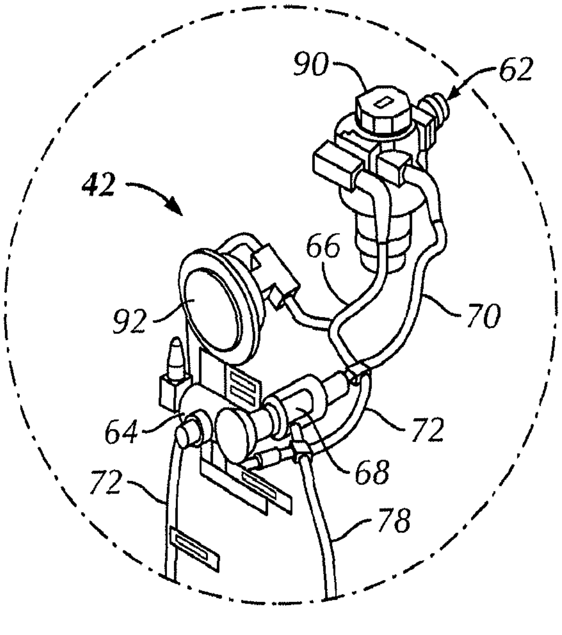
FIG. 3 is a perspective view of a lift control assembly for the shaker lift system.
Figure 4:
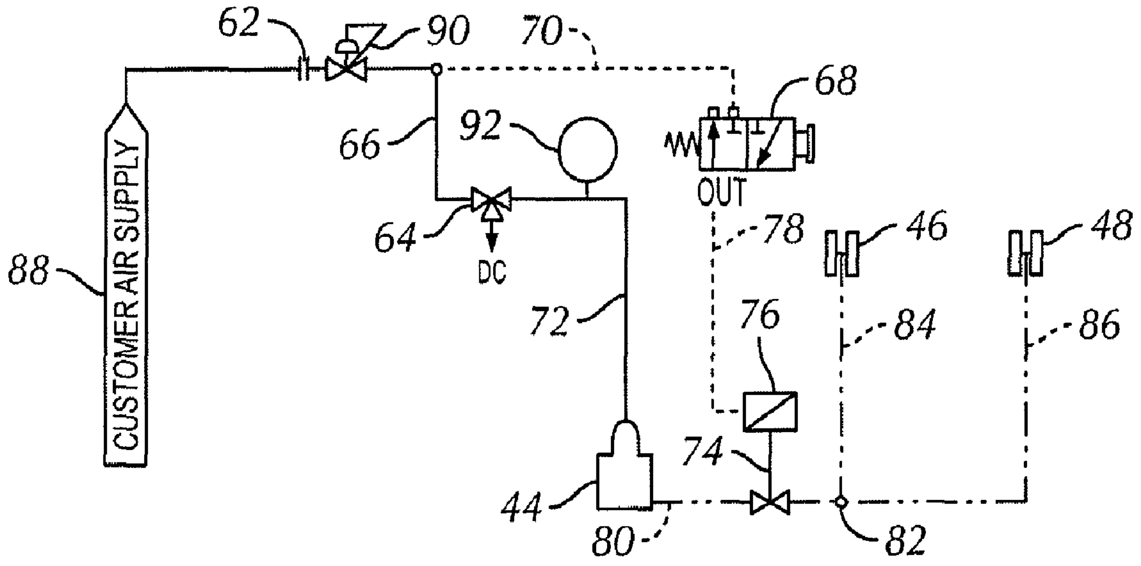
FIG. 4 is a piping and instrumentation diagram of an embodiment of the shaker lift system.
Figure 5:
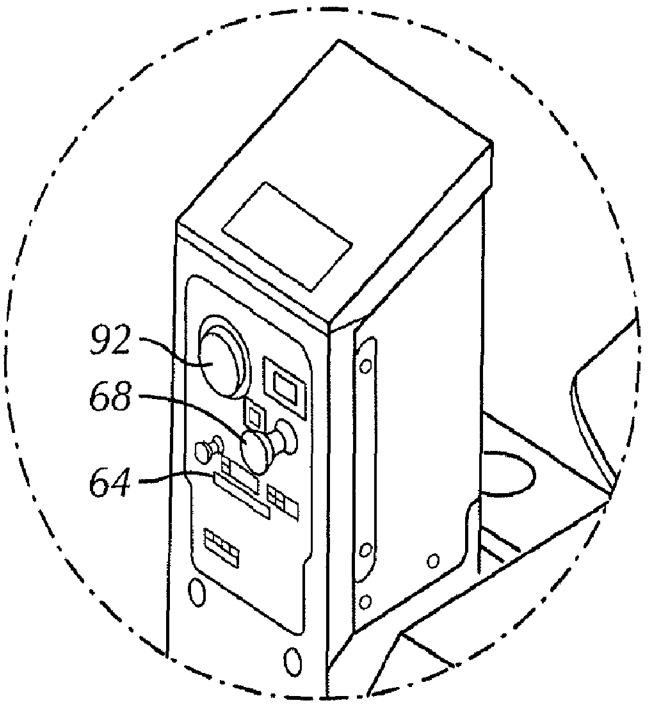
FIG. 5 is a perspective view of a control panel.

Referring to FIGS. 3 and 4, the lift control assembly 42 includes an air inlet 62 into which pressurized air is fed. The pressurized air is provided to a first valve 64 via a first pneumatic line 66 and to a second valve 68 via a first pilot line 70. The first valve 64 is connected to a second pneumatic line 72 leading to the hydraulic tank 44. A third valve 74 has an actuator 76 that is connected via a second pilot line 78 to the second valve 68. The third valve 74 opens and closes a pathway between a first hydraulic line 80 from the hydraulic tank 44 and a hydraulic junction 82 providing liquid to second and third hydraulic lines 84, 86 leading to the first and second bellows 46, 48. The lift control assembly 42 is discussed in further detail below.

Fluid to the first bellow 46 is provided through second hydraulic line 84 while fluid to the second bellow 48 is provided through third hydraulic line 86. The second and third hydraulic lines 84, 86 are connected to the hydraulic junction 82 in parallel such that, when the third valve 74 is open, liquid is communicated to the first and second bellows 46, 48 simultaneously. Further, when the third valve 74 is closed, the liquid may be communicated between the first bellow 46 and the second bellow 48 via the second and third hydraulic lines 84, 86.

Continuing to refer to FIGS. 2-4, air from a pressurized air supply 88 enters the lift control system 40 through the air inlet 62. A pressure regulator 90 is preferably included at the inlet 62 to provide an air stream at a predetermined pressure to the system. The preferred pressure will depend upon the weight to be lifted and the physical properties of the liquid to be communicated between the hydraulic tank 44 and the first and second bellows 46, 48 at within the anticipated ambient operating conditions. A pressure gauge 92 is preferably included along the second pneumatic line 72 between the first valve 64 and the hydraulic tank 44 to use in the adjustment of the pressure regulator 90.

Air from the pressure regulator 90 is provided to the first valve 64 through the first pneumatic line 66 and to the second valve 68 through the first pilot line 70. The first valve 64 can be toggled between two positions, corresponding to raising and lowering the discharge end 30 of the shaker bed 12. Further, the first valve 64 is a three-way valve, that is there are three ports into or out of which air may be directed. In a first position, corresponding to the operation of raising the discharge end 30, the pressurized air from the regulator 90 enters one port of the first valve 64 and exits a second port of the first valve 64, which port directs the air to the second pneumatic line 72 and the hydraulic tank 44. In a second position of the first valve 64, corresponding to the operation of lowering the discharge end 30, air, displaced by fluid forced back into the hydraulic tank 44, is forced from the hydraulic tank 44 through the second pneumatic line 72 to the first valve 64 is vented through a third port of the first valve 64. In one embodiment, the first valve 64 is a three-way, two position ball valve.

In one embodiment, the second valve 68 is biased to a closed position such that the pressurized air from the first pilot line 70 is not directed to the second pilot line 78 unless the second valve 68 is manually actuated. While in the normally closed position, the second valve 68 provides a vent for air in the second pilot line 78. Upon actuation of the second valve 68, the pressurized air from the first pilot line 70 is directed to the second pilot line 78. Air directed through the second pilot line 78 provides communication to the actuator of the third valve 74, thereby actuating the third valve 74 when the second valve 68 is actuated. In one embodiment, the second valve 68 is a signal valve.

The third valve 74 is biased to a closed position thereby preventing communication of liquid through the first hydraulic line 80 to the hydraulic junction 82. As previously explained, when the third valve 74 is actuated, fluid flow between the hydraulic tank 44 and the first and second bellows 46, 48 is open. In one embodiment, the third valve 74 is a two-way ball valve.

Figure 6:
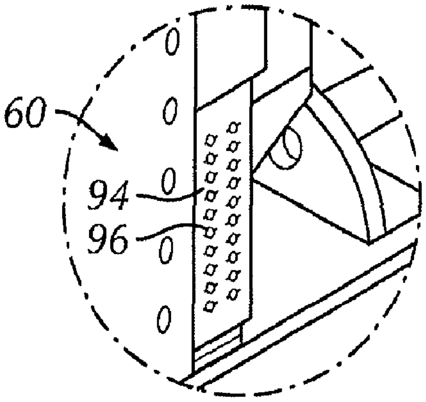
FIG. 6 is a perspective view of an angle indicator.

Referring to FIGS. 2, 3, and 6, to operate the lifting system 40, an operator will position the first valve 64 in a desired position corresponding to whether the shaker discharge end 30 will be raised or lowered. To lift the discharge end 30 of the shaker separator 10, the operator will place the first valve 64 in a corresponding position using a handle, knob, or other such operator interface. Air from the air supply 88 as regulated by the pressure regulator 90 is directed through the first valve 64 to the hydraulic tank 44. So long as the third valve 74 is closed, communication of fluid from the hydraulic tank 44 to the first and second bellows 46, 48 is prevented and the shaker 10 will maintain its initial incline.

To raise or lower the discharge end 30, the operator actuates the second valve 68 thereby providing pressurized air to the actuator 76 of the third valve 74. Actuation of the third valve 74 opens the passage between the first hydraulic line 80 and the hydraulic junction 82. The pressurized air fed into the hydraulic tank 44 as a result of positioning the first valve 64 in the desired position, forces the liquid in the tank 44 through the first hydraulic line 80 to the hydraulic junction 82. From the hydraulic junction 82, the fluid is directed through the second and third hydraulic lines 84, 86 to the first and second bellows 46, 48 respectively. As the fluid fills the first and second bellows 46, 48, each bellow 46, 48 expands to raise the discharge end 30 of the shaker separator 10.

Once the desired incline of the bed 12 is achieved, the operator releases the second valve 68, thereby closing it and releasing the actuator 76 of the third valve 74. When the actuator 76 is released, the third valve 74 returns to a closed position. Thus, the fluid transferred to the first and second bellows 46, 48 and the second and third hydraulic lines 84, 86 is confined. If the first bellow 46 contains more fluid than the second bellow 48 or vice versa, the weight of the shaker separator 10 will force the fluid to equalize between the first bellow 46 and the second bellow 48, thereby leveling the discharge end 30 from side to side.

To lower the discharge end 30 of the shaker separator 10, an operator places the first valve 64 to a second position corresponding to lowering the discharge end 30, again using a handle, knob, or other such interface device. When the first valve 64 is placed into the second position, any air under pressure in the second pneumatic line 72 and the hydraulic tank 44 may be vented. So long as the third valve 74 remains closed, only a minimal amount of air will be vented and the discharge end 30 will remain in the raised position.

The operator actuates the second valve 68 to open fluid communication from the air supply 88 to the actuator 76 of the third valve 74. When the air through the second pilot line 78 actuates the third valve 74, the third valve 74 opens to provide fluid communication of the liquid between the first and second bellows 46, 48 and the hydraulic tank 44. With pressure on the fluid released, the fluid moves back into the hydraulic tank 44 while the third valve 74 is open. The weight of the shaker separator 10 on the first and second bellows 46, 48 forces the liquid back into the hydraulic tank 44. Air from the hydraulic tank 44, displaced by the liquid, is forced back through the second pneumatic line 72 and vented through the first valve 64.

When the bed 12 of the shaker separator 10 has reached the desired declination angle, the operator releases the second valve 68 to stop the flow of liquid from the first and second bellows 46, 48 to the hydraulic tank 44. This again confines the fluid in the first and second bellows 46, 48 and the second and third hydraulic lines 84, 86 and freezes the discharge end 30 in the desired position.

Referring to FIGS. 1, 2, and 6, to assist the operator in adjusting the discharge end 30 of the shaker separator 10, a means for indicating a position of the discharge end 60 may be coupled between the shaker bed 12 and the floor or skid on which the shaker 10 is located. Indicator plates 94 may be located adjacent to one or both of the bellows 46, 48. The indicator plates 94 may include graduation lines corresponding desired positions of the discharge end 30. Graduation lines may correspond to a height of the discharge end 30 above the skid or the floor. Graduation lines may correspond to an angle of the shaker bed 12 with respect to the skid or the floor. A marker 96, or pointer, such as piece of formed sheet metal coupled to the bed 12 of the shaker separator 10 may be used to mark the angle of incline of the discharge end 30 of the shaker separator 10 relative to the skid 32 or floor to which the shaker separator 10 is mounted.

Referring to FIG. 2, a track system 98 may be provided to guide the vertical movement of each of the first and second bellows 46, 48. The track system 98 includes upright plates 100, 102 located on opposing sides of each bellow 46, 48. The inner upright plate 100 for the first bellow 46 is shown in FIG. 2, while the corresponding outer upright plate 102 may be seen in FIG. 1. Each upright plate 100, 102 has a vertical track 104 along its inner surface 106. Each shroud 54 is provided with rollers 108, which roll along the track 104. A wall 110 extending from each upright plate 100, 102 helps keep the rollers 108 in a confined area near the track 104.

One of skill in the art will appreciate that some variation of the components described are possible. For example the first and second bellows 46, 48 may be replaced with other types of hydraulic lifters. Another variation includes replacing the first and second bellows 46, 48 with a single lifter centrally located along the discharge end 30 of the shaker bed 12.

Figure 7:
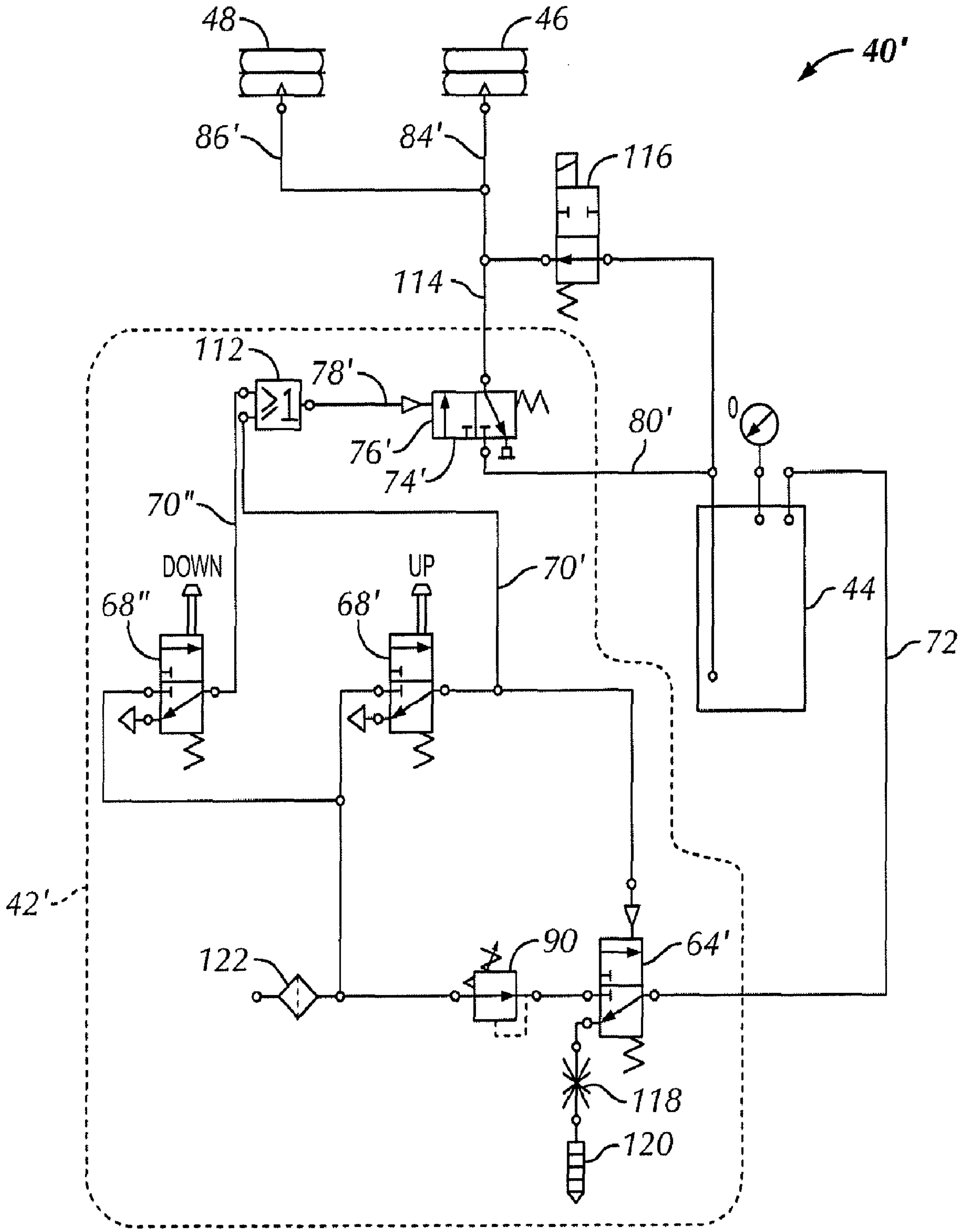
FIG. 7 is a piping and instrumentation diagram of an embodiment of the shaker lift system.

In one embodiment of the lifting system 40', depicted in FIG. 7, the lift control assembly 42' includes a tank control valve 64', a pair of pilot control valves 68', 68", a shuttle valve 112, and a skinner fluid valve 74'. The pilot control valves 68', 68" and the skinner fluid valve 74' are biased to a closed position. Air from an air supply (not shown) is split, with a first stream directed through a pressure regulator 90 to the tank control valve 64' and a second stream split again into a first sub-stream and a second sub-stream. The first sub-stream is directed to the first pilot control valve 68' and the second sub-stream is directed to the second pilot control valve 68".

A pneumatic line 72 connects the tank control valve 64' to the hydraulic tank 44. A first pilot line 70' connects the first pilot valve 68' to the shuttle valve 112 and a second pilot line 70" connects the second pilot valve 68" to the shuttle valve 112. A third pilot line 78' connects the shuttle valve 112 to an actuator 76' on the skinner fluid valve 74'. A first hydraulic line 80' connects the hydraulic tank 44 to the skinner fluid valve 74'. A second hydraulic line 114 splits into two sub-hydraulic lines 84', 86' going to each of the bellows 46, 48, which are coupled to the shaker separator 10 near the discharge end 30.

To raise the discharge end 30 of the shaker separator 10, an operator actuates the first pilot valve 68'. Air flows through the first pilot valve 68' to the shuttle valve 112 and to a pilot port of the tank control valve 64'. The shuttle valve 112 directs the air to the third pilot line 78' and actuates the skinner fluid valve 74'. Actuation of the skinner fluid valve 74' opens fluid communication between the hydraulic tank 44 and the bellows 46, 48 through the first hydraulic line 80' and the second hydraulic line 114. The air flow to the pilot port of the tank control valve 64' actuates the tank control valve 64' to provide pressure regulated air to the hydraulic tank 44.

The pressure regulated air displaces fluid in the hydraulic tank 44, causing the fluid to exit the tank 44 through the first hydraulic line 80'. The fluid is forced from the tank 44 through the skinner fluid valve 74' into the bellows 46, 48, causing them to expand and raise the discharge end 30 of the shaker separator 10. When the first pilot valve 68' is released by the operator, air pressure through the first pilot line 70' to the shuttle valve 112 and air pressure to the pilot port of the tank control valve 64' drops. The drop in air pressure on the shuttle valve 112 releases the actuation of the skinner fluid valve 74', returning it to its normally closed position and terminating fluid communication between the hydraulic tank 44 and the bellows 46, 48. The drop in air pressure to the tank control valve 64' releases it to its normal position wherein air in the hydraulic tank 44 and the pneumatic line 72 is vented and air flow into the hydraulic tank 44 from the air supply is stopped.

To lower the discharge end 30 of the shaker separator 10, the operator actuates the second pilot valve 68". When the second pilot valve 68" is actuated, air is directed to the shuttle valve 112. The pilot signal to the shuttle valve 112 causes it to open and provide air flow to the third pilot line 78', thereby actuating the skinner fluid valve 74'. Upon actuation of the skinner fluid valve 74', the first and second hydraulic lines 80', 114 are in fluid communication, providing fluid communication between the bellows 80', 114 and the hydraulic tank 44. The tank control valve 64' remains in its biased position wherein air from the hydraulic tank 44 is vented therethrough.

The bellows 46, 48 are compressed by the weight of the shaker separator 10 causing the fluid therein to flow back to the hydraulic tank 44. Air displaced by the fluid is vented through the tank control valve 64'. When the bed 12 has reached the desired angle, the operator releases the second pilot valve 68", forcing the cessation of the pilot signal to the shuttle valve 112 and the return of the skinner fluid valve 74' to its biased, closed position. The closure of the skinner fluid valve 74' stops flow from the bellows 46, 48 to the hydraulic tank 44 and the bed 12 is maintained at the desired angle.

In one embodiment, an electrical interlock solenoid valve 116 is included in parallel with the skinner fluid valve 74' between the first and second hydraulic lines 80', 114. In one embodiment, a needle valve 118 and silencer 120 is included at the venting port of the tank control valve 64'. In one embodiment, a filter 122 is included at the inlet to the lift control assembly 42'.

Figure 8:
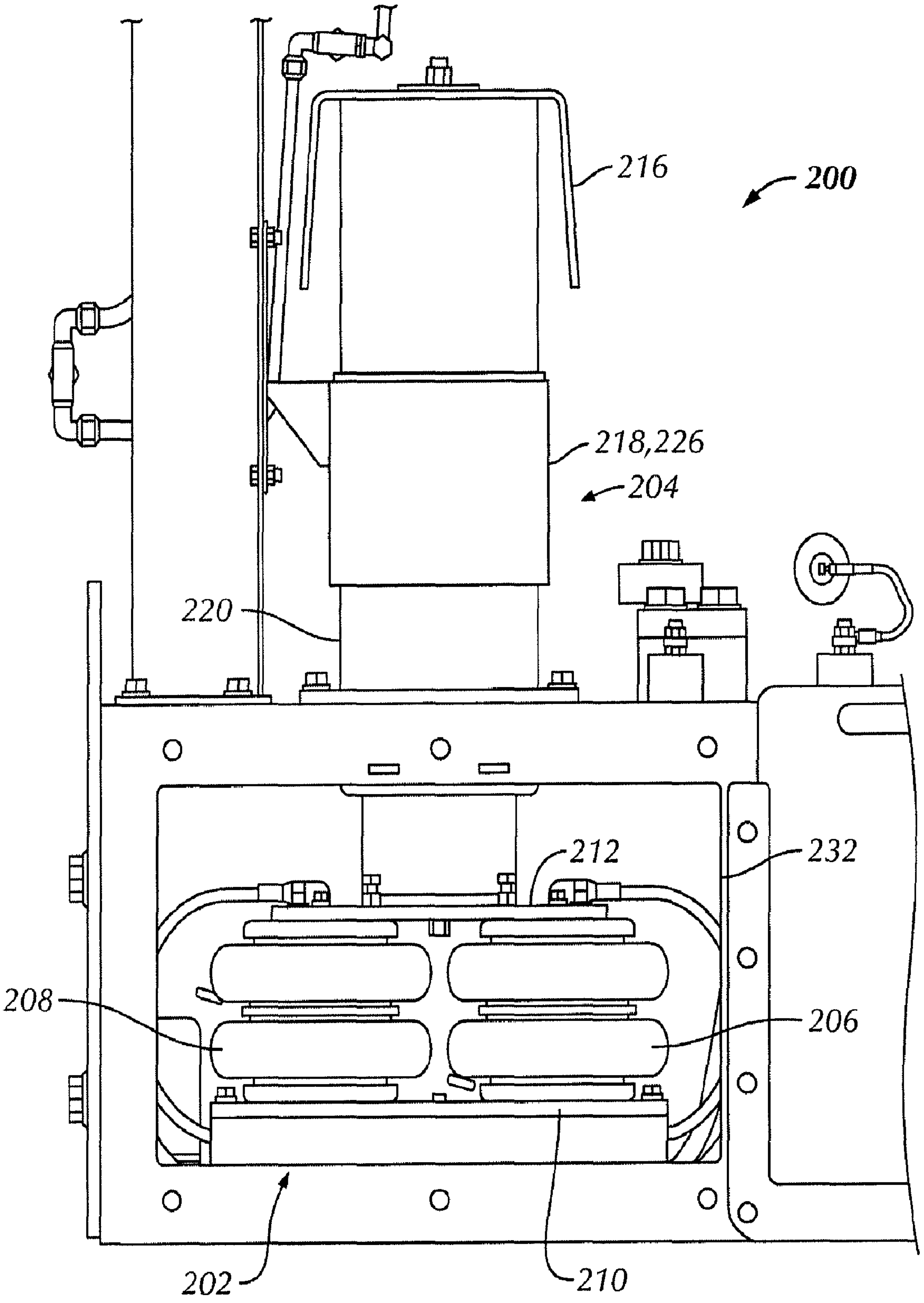
FIG. 8 is a perspective view of an alternative lifting mechanism in accordance with embodiments of the present disclosure.
Figure 9:
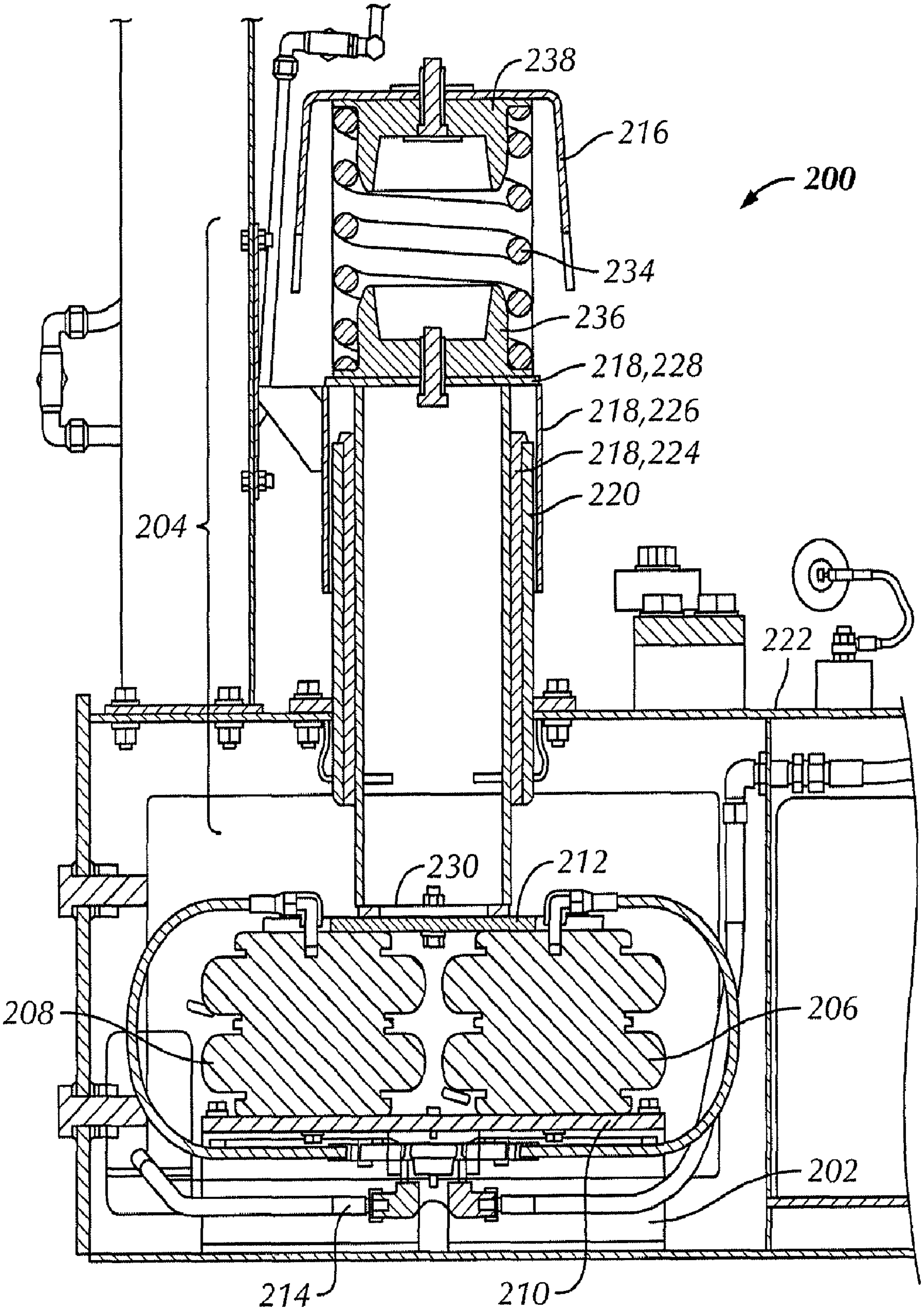
FIG. 9 is a cross-sectional view of the alternative lifting mechanism of FIG. 8.

Referring now to FIGS. 8 and 9, an alternative mechanism for lifting and guiding vertical movement of a shaker separator (e.g., 10 of FIG. 1) may be described. In particular, each bellows (46, 48 of FIGS. 1-7) may be replaced with a lifting mechanism 200 that includes a lifting apparatus 202 and a vertical alignment apparatus 204. Lifting apparatus 202 includes two hydraulic bellows 206, 208 sandwiched between a bottom plate 210 and a top plate 212 for transmitting hydraulic energy from a hydraulic line 214 (similar to 84 and 86 of FIG. 4) to lift either a free end or a discharge end of a separator shaker assembly. While lifting apparatus 202 is shown having two bellows 206 and 208, it should be understood that fewer or more bellows may be used without departing from the scope of the present disclosure. Further, dual bellows 206 and 208 may be replaced with a single, larger bellows if desired.

Vertical alignment apparatus 204 extends between top plate 212 of lifting apparatus 202 and an adapter plate 216 (similar to 56 of FIG. 2) of the shaker separator. In selected embodiments, vertical alignment apparatus 204 is designed to ensure the displacement and forces transmitted from bellows 206 and 208 are substantially linear and vertical as would be desired by those having ordinary skill in the art. Alternatively, it should be understood that vertical alignment apparatus 204 may be angled such that displacement and forces are transmitted in a substantially linear, but not necessarily vertical orientation, if desired.

As such, vertical alignment apparatus 204 includes an actuated cylinder assembly 218 configured to reciprocate within a sleeve 220 affixed to a frame 222 of the shaker separator. Sleeve 220 may be affixed to frame 222 by any mechanism known to those having ordinary skill including, but not limited to, welding, bolting, press fitting, brazing, and the like. With sleeve 220 rigidly affixed to frame 222, cylinder assembly 218 is able to linearly displace therethrough when actuated by top plate 212. Further, by selecting the length and relative position of sleeve 220 within frame 222, the top and bottom ends of sleeve 220 may be used to limit a maximum and a minimum amount of stroke of cylinder assembly 218, described below in more detail.

Furthermore, cylinder assembly 218 includes an inner cylinder 224, an outer cylinder 226, and a top plate 228. As such, an outer diameter of inner cylinder 224 is sized to engage through an inner diameter of sleeve 220 so that top plate 228 may be raised and lowered as bellows 206 and 208 of lifting apparatus 202 are inflated and deflated. An alignment ring 230 having an outer profile approximate to an inner diameter of inner cylinder 224 is rigidly affixed to top plate 212 so that cylinder assembly 218 is maintained in proper alignment at all times during the stroke of lifting apparatus 204.

Additionally, outer cylinder 226 of cylinder assembly 218 extends downward from top plate 228 and includes an inner diameter larger than an outer diameter of sleeve 220. Thus, outer cylinder 226 may act as a cap to prevent fluids and debris from entering the annular gap formed between sleeve 220 and inner cylinder 228. Advantageously, by preventing fluids and debris from entering the annular gap between sleeve 220 and inner cylinder 228, the same fluids and debris may be prevented from entering a compartment 232 within frame where lifting apparatus 202, bellows 206 and 208, and various other components are housed.

Furthermore, because shaker separator will experience to a large amount of vibration, a spring 234 may be mounted between top plate 228 of cylinder assembly 218 and adapter plate 216 to isolate lifting apparatus 202 and alignment apparatus 204 from vibrations. As such, a spring mount 236 may retain a bottom portion of spring 234 to top plate 228, and a corresponding upper spring mount 238 may be mounted under adapter plate 216. Furthermore, while only spring 234 is shown, it should be understood that a viscous coupling or other form of vibration dampener may be use in conjunction with or in place of spring 234. Furthermore, one of ordinary skill in the art will appreciate that bellows 206 and 208 will also have inherent spring and dampening characteristics also.

Advantageously, lifting mechanism 200 enables hydraulic bellows 206 and 208 to be positioned below (e.g., in compartment 232 of frame 222) a shaking separator deck to be raised and/or lowered. Further, alignment apparatus 204 enables any lifting force from bellows 206 and 208 to be applied substantially linearly in a desired direction so that damage from long term vibratory side, or translational, loading is minimized. Furthermore, by locating lifting bellows 206 and 208 beneath the shaker deck, torsional loads to the deck resulting from the lifting forces may be reduced. Further, lifting mechanisms in accordance with embodiments disclosed herein may be positioned at either a free end of a shaking separator, a discharge end of the shaking separator, or at both ends (i.e., all four corners) control the amount and direction of relative shaker screen tilt desired.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus to lift an oilfield machine, the apparatus comprising:
- at least one lifting bellows;
- an alignment assembly extending between at least one lifting bellows and an adapter plate of the oilfield machine;
- the alignment assembly comprising an inner cylinder to reciprocate within a sleeve of the oilfield machine; and
- the alignment assembly comprising a top plate at an upper end of the inner cylinder, the top plate configured to transfer forces from the at least one lifting bellows and the inner cylinder to the adapter plate;
- wherein the sleeve is configured to restrict the inner cylinder to a substantially linear displacements therethrough.

2. The apparatus of claim 1, wherein the oilfield machine comprises a shaking separator.

3. The apparatus of claim 2, wherein the at least one lifting assembly is located at a free end of the shaking separator.

4. The apparatus of claim 2, wherein the at least one lifting assembly is located at a discharge end of the shaking separator.

5. The apparatus of claim 1, wherein the at least one lifting bellows comprises a hydraulic bellows.

6. The apparatus of claim 1, wherein the at least one lifting bellows comprises a pneumatic bellows.

7. The apparatus of claim 1, further comprising an outer cylinder extending over an outer profile of the sleeve from the top plate.

8. The apparatus of claim 1, further comprising a spring assembly located between the top plate and the adapter plate.

9. The apparatus of claim 8, wherein the spring assembly includes an upper and a lower spring mount.

10. The apparatus of claim 8, wherein the spring assembly includes a dampening mechanism.

11. A method to lift an oilfield machine, the method comprising:

positioning at least one lifting bellows beneath a component of the oilfield machine to be raised;

positioning an alignment assembly between the at least one lifting bellows and an adapter plate of the component, wherein the alignment assembly comprises an inner cylinder and a top plate;

wherein the inner cylinder is configured to reciprocate within a sleeve of the oilfield machine;

inflating the lifting bellows beneath to raise the component with the inner cylinder; and restricting the inner cylinder to a substantially linear displacements with the sleeve.

12. The method of clam 11, wherein the oilfield machine is a shaking separator.

13. The method of claim 12, further comprising positioning the at least one lifting bellows at a free end of the shaking separator.

14. The method of claim 12, further comprising positioning the at least one lifting bellows at a discharge end of the shaking separator.

15. The method of claim 11, further comprising providing an outer cylinder from the top plate and covering an outer profile of the sleeve with an inner profile of the outer cylinder.

16. The method of claim 11, further comprising isolating the adapter plate from the inner cylinder with a spring assembly.

17. The method of claim 16, further comprising dampening vibrations with the spring assembly.

* * * * *